United States Patent [19]

Balcar et al.

[11] 4,147,616

[45] Apr. 3, 1979

[54] APPARATUS FOR DEINKING PRINTED WASTEPAPERS

[75] Inventors: Cestmir Balcar, Roztoky; Antonin Kostka, Bratislava; Jaroslav Havranek, Bratislava; Marcel Lalak, Bratislava, all of Czechoslovakia

[73] Assignee: Vyskumny ustav papieru a celulosy of Bratislava, Bratislava, Czechoslovakia

[21] Appl. No.: 753,568

[22] Filed: Dec. 22, 1976

Related U.S. Application Data

[63] Continuation-in-part of Ser. No. 233,034, Mar. 9, 1972, abandoned, Ser. No. 478,286, Jun. 11, 1974, abandoned, and Ser. No. 582,368, May 30, 1975, Pat. No. 4,013,505.

[51] Int. Cl.² .................... B03B 9/00; B03D 1/24; B04C 5/26
[52] U.S. Cl. ......................... 209/12; 209/170; 209/211
[58] Field of Search ............... 209/211, 168, 170, 12; 210/512 R, 512 M; 162/4, 5, 55

[56] References Cited

U.S. PATENT DOCUMENTS

| 2,642,185 | 6/1953 | Fontein | 209/211 |
| 2,819,795 | 1/1958 | Fontein et al. | 209/211 |
| 2,843,265 | 7/1958 | Rakowsky | 209/211 X |
| 2,886,287 | 5/1959 | Croley | 209/211 X |
| 2,965,522 | 12/1960 | Crespin et al. | 209/211 X |
| 3,334,516 | 8/1967 | Cedrone | 210/512 R X |
| 3,391,787 | 7/1968 | Salomon | 210/512 R X |
| 3,696,934 | 10/1972 | Oisi | 210/512 R |

OTHER PUBLICATIONS

Trawinski, H., "Theory, Applications, and Practical Operation of Hydrocyclones", E/MJ, Sep. 1976, pp. 115–127.

Primary Examiner—Ralph J. Hill

[57] ABSTRACT

An apparatus for deinking printed wastepapers in a system of separators through which printed wastepapers, previously impregnated with surface-active agents and alkalis, and repulped in the presence of an organic hydrocarbon compound and high-adsorptive flakes obtained by precipitating solutions of metal soaps of fatty or bituminous acids with solutions of salts of alkaline earths, are forced. The adsorptive flakes containing printing ink are separated from the repulped paper stock by latent vortex action.

4 Claims, 1 Drawing Figure

APPARATUS FOR DEINKING PRINTED WASTEPAPERS

This application is a continuation-in-part of application Ser. No. 233,034, filed Mar. 9, 1972, now abandoned, of application Ser. No. 478,286, filed June 11, 1974, now abandoned, and a division of application Ser. No. 582,368, now U.S. Pat. No. 4,013,505 issued Mar. 27, 1977.

BACKGROUND OF THE INVENTION

The present invention relates to a method of and an apparatus for deinking printed wastepapers.

In accordance with well-known methods, printed wastepapers have hitherto been deinked in such a way that the feedstock has been exposed to an action of mechanical power, chemicals and heat, particularly in aqueous media. The actual removal of released printing inks from a fiber suspension or pulp has been carried out by washing or by flotation. In the prior art there have existed a large number of processes differing from one another by amounts and types of deinking chemicals used. All processes, however, have been characterized by common basic disadvantages resulting from the very methods of separating printing inks by washing or by flotation.

An essential problem to face in deinking processes resides, in general, in that the released particles of printing inks have to be prevented from being resorbed by fibers, the resorption taking place due to the fact that the aforesaid processes have been carried out in strongly alkaline media and that the fibers soaked with alkaline possess a relatively high adsorptive power. In the deinking processes, the printing inks are usually released within a very broad range of particle sizes, to wit, from the prevailing finest particles up to coarse grained ones which latter are visible with naked eye. It is why the separation of printing inks once released is rather difficult, since it is impossible to separate particles finer than 2 microns from the fiber by flotation. In addition, the flotation methods of separating printing inks, as a rule, lay excessive claims on industrial installations, in view of the size and number of the requisite flotation cells necessary to obtain desirable effects.

Another disadvantage of the flotation processes consists in a technically rather elaborate preparation of an air-dispersion in the flotation cell as well as in a complicated attendance resulting from a considerable sensitivity of the respective processing plant, which depends upon the necessity of absolutely homogeneous dosing rates and upon composition of the wastepapers feedstock. Every change in the composition of the respective wastepaper batch, requires a selective readjustment of the flotation plant as well as of the overall process.

On the other hand, deinking methods wherein the released printing inks are separated by washing, are connected with the generation of a considerable waste water volume and with troubles in processing highly diluted sludges of which removal is usually very elaborate and uneconomical. Any discharge of waste waters left after washing which is fed immediately into recipient water courses without prior liquidation of sludges is forbidden by law.

The purpose of the present invention and the basic object of the same is to overcome the aforementioned disadvantages and to significantly improve the deinking of printed wastepapers.

SUMMARY OF THE INVENTION

In accordance with one feature of our invention we provide a method of deinking printed wastepapers, which comprises the impregnating of the printed wastepapers with a solution, for example, 100 liters of water with dissolved surface-active agents in an amount of from 0.2 to 2.0 per cent by weight of wastepaper charge and with alkali-reacting substances in an amount of from 0.5 to 4.0 per cent by weight of wastepaper charge, the repulping of the same and simultaneously treating it with terpene hydrocarbons or alcohols, aliphatic or aromatic hydrocarbons, or alcohols, such as petroleum, crude oil and the like, or with a mixture thereof, there being added thereto a suitable vehicle, such as high-adsorptive flakes, of which size can be controlled by setting suitable condition of the precipitating process. The printing ink once released in the repulping process coagulates and adsorbs onto the flakes whereby relatively big-size granular particles arise, which are suitable for being separated from the stock in the proposed apparatus as hereinafter referred to.

In order to utilize also the centrifugal component of the separating force during the separating process to be effected in the apparatus proposed, the high-adsorptive flakes can be loaded with some natural or synthetic loading substances, such as bentonite, china clay, blavo fixer, gypsum, barytes, activated silica, magnetite, and the like, said loading substances being added during the precipitating process in an amount of from 0.5 to 5.0 per cent by weight of wastepaper charge, together with terpene hydrocarbons, or alcohol in an amount from 0.2 to 2.0 per cent by weight of metal soap used. The flakes of the resulting precipitate loaded with the aforementioned loading substances keep in the process according to the present invention their shape characteristics while their power of adsorbing themselves onto the released printing ink particles even increases. The temperature of the precipitation process should be kept within the limits of from 15 to 70° Centigrade. The concentration of the fatty and bituminous acids and the amount of the loading substances as well as of the terpene alcohol added is to be determined in accordance with the end use, that means the type of wastepaper to be processed, of the printing ink, or the like.

For carrying out the aforedescribed method of deinking printed wastepapers an apparatus has been proposed. The apparatus operates upon the principle of a latent vortex and designed for separating the aforementioned granular particles with printing ink content from the wastepaper stock, and comprises a series of separator batteries both the diameter and length of which cells gradually decrease in downstream direction, the conicity and the cross-section thereof being predetermined by the differential size and gravity of said granular particles as they pass through the separating system.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

The single sheet of drawing shows a somewhat schematical vertical sectional view of an apparatus for deinking printed wastepapers.

DESCRIPTION OF THE PREFERRED EMBODIMENT

Figure 1:
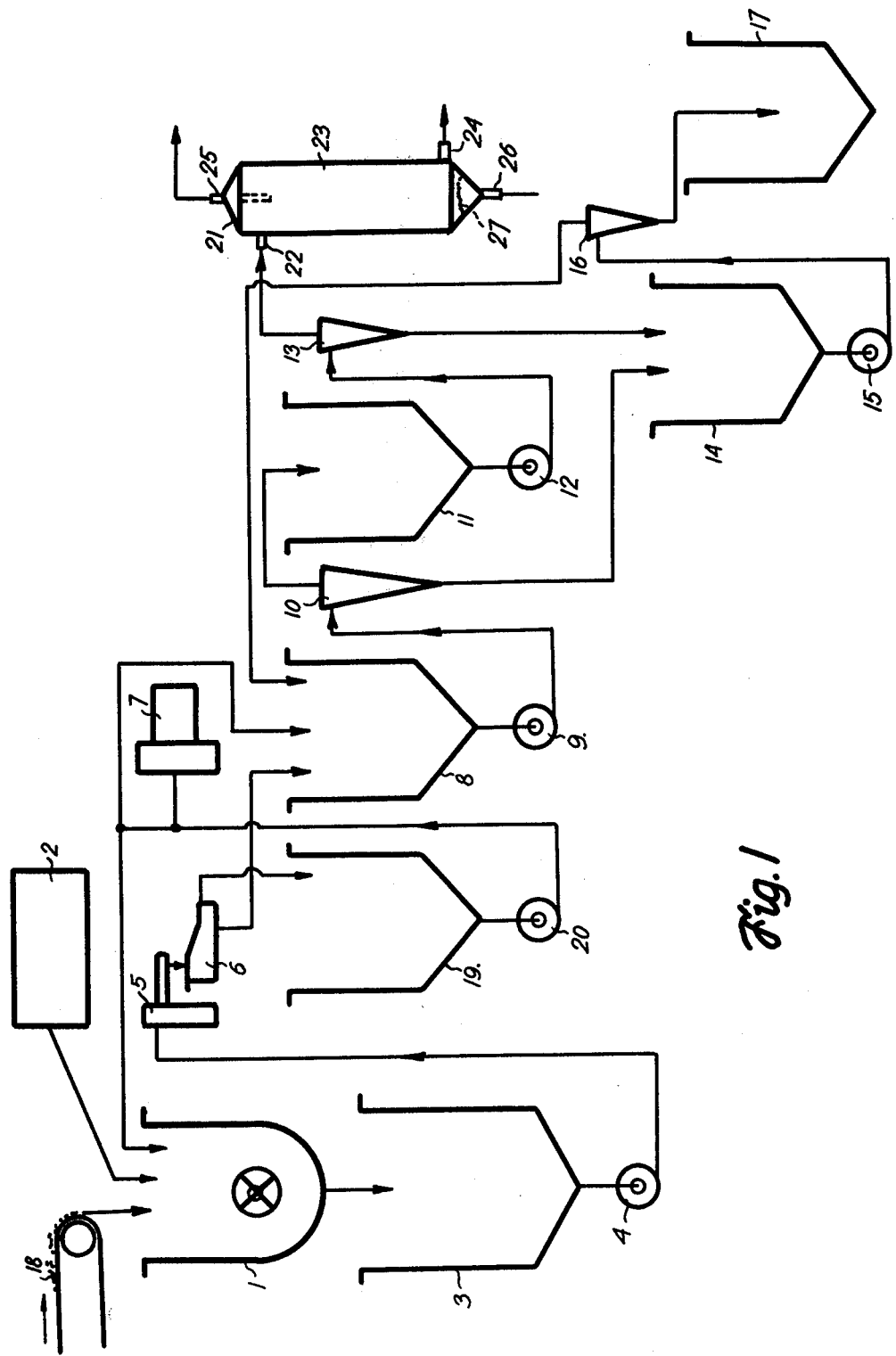

Discussing now the drawings in detail, it will be seen that reference numeral 1 identifies a substantially vertical impregnator-repulper, it being irrelevant whether the repulper cell and the impregnator form one, or whether two separate cells are used and the fiber raw material is conveyed from the impregnator into the repulper. A suitable vessel, e.g. the impregnator-repulper 1 is adapted to be filled up, within given time intervals, with a solution of chemicals supplied from a preparation tank 2 and with wastepapers supplied by a conveyor 18, the cell content being simultaneously heated to a temperature of from 20° to 70° Centigrade. After an obligatory retention period of impregnation within the range of from 5 to 60 minutes has elapsed, the actual repulping process takes place, wherein granular particles with printing ink content will arise. Once repulped, the raw feed stock is discharged into a storage tank 3 of which content will then be forced by means of a pump 4 into a thick pulp separator 5 where it is freed from heavy contaminants prone to cause failures in further processing. The term "thick pulp separator" means a high density cleaner serving for the separation of impurities having a specific weight greater than that of pulp fiber, e.g. "Dickstoffreiniger" produced by the firm Voith GmbH (West Germany), working with an average consistency of 4%. The stock, once freed from said heavy contaminants will then be advanced to a strainer 6 where not yet repulped remnants are separated therefrom. The stock is then conveyed into a diluting tank 8 where it is diluted to a value of from 0.3 to 1.2 percent of dry solid fiber content. From the diluting tank 8 the diluted stock is forced by another pump 9 to the first step of a separator battery 10 of such a capacity to enable, as early as in said first step, the coarsest proportions of granular particles with printing ink content to be separated. From the separator battery 10, the purified or fair stock is conveyed into a tank 11 from which it will then be pumped by means of a pump 12 onto another separator battery 13 designed to separate therefrom the remaining granular particles with printing ink content. Diluates coming from both the separatory batteries 10 and 13 are discharged into a tank 14 wherefrom they are repumped by means of a pump 15 onto another separator battery 16. The purified stock discharged from the aforesaid separator battery 16 will then be recycled back into the diluting tank 8 and the ejects are collected in a tank 17 for reuse. The fair stock withdrawn from the separator battery 13 is transported into inlet holes 22 of a final separator battery 21 designed for separating the finest contaminants therefrom. The separator battery 21 is formed with an upright cylindrical vessel 23 having in its top portion said tangential inlet hole 22 and provided with a tangential outlet hole 24 in the bottom portion thereof. The two holes 22 and 24, respectively, are oriented in the direction of a latent vortex along an outer vortex. In addition, the cylindrical vessel 23 is provided with an axially disposed outlet tube 25 designed for withdrawing the finest separated contaminants from its uppermost part while in its lowermost part the vessel 23 is provided with a tube 26 for intake of a gaseous medium or water/gas dispersion into the separator battery 21. Before entering the separator battery 21 said gaseous medium is caused to pass through a perforated partition 27 designed for uniformly distributing the same all over the cross-section of the separator battery 21 wherein the intake rate of the substance supplied into the upper tangential inlet hole 22 is to be selected so that the ascension velocity of the gaseous medium or water/gas dispersion be higher than the descension one of the suspension flowing through the cross-section of the separator battery 21.

It is to be understood that both the diameter and the length of separator cells of the entire separating system gradually decrease in downstream direction and that the conicity and cross-section thereof are predetermined by the differential size and gravity of said granular particles as they pass through the system.

The merits of the proposed method and apparatus relative to well-known methods and apparatuses for deinking printed wastepapers as heretofore used consist in that the floor space requisite for the installation of the apparatus according to the present invention is relatively small because of small dimensions of the separating system and further that the aforesaid apparatus lays but low claims both upon power consumption and attendance, and finally that it is but slightly responsive to any changes encountered in the wastepaper charges.

An important secondary effect of the aforedescribed method and apparatus resides also in the fact that the proportion taken off from the separating system can be used as an admixture to low-grade fibrous products so that they enable thus any losses on fiber to be practially reduced to minimum.

The decrease of the solution volume used in the process of deinking printed wastepapers according to the proposed method performed in the respective apparatus is given but by the loss on the solution carried along with the deinked pulp to be processed in further steps.

While the invention has been illustrated and described as embodied in a method and apparatus for deinking printed wastepapers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art clearly constitute essential characteristics of the generic or specific aspects of this invention and therefore, such adaptations should and are intended to be comprehended within the meaning and range of equivalence of the following claims.

EXAMPLE I 3 kgs of waste newsprint and 0.5% by weight of the paper of a surface active agent such as Alfonal K which is a commercial designation of a product of condensation of fatty acids with diethanol amine, in a solution were placed into a vertical impregnator repulper. To the content in the impregnator-repulper 1% by weight of the paper of sodium hydroxide was added. The waste paper was allowed to absorb the mentioned substances for 20 minutes within which period the fiber swelled, the printing ink - paper bonds released. The mixture was heated to 50° C. and defibering 2.5% by weight of the paper of a terpenic hydrocarbon (e.g. pine oil) and thereafter 5% by weight of the paper of highly adsorptive flakes were added. The flakes were prepared separately by precipitating a solution of sodium salt of tall oil soap in the amount of 0.09 kg of a calcium chloride solution in a stoichiometric excess and with an additive of 0.06 kg of a loading agent such as e.g. china clay. In this process due to a mechanical effect, particles of printing ink were stripped and separated from the fibers, while the printing inks were dispersed in the substance suspension and adsorbed onto the highly adsorptive flakes of the vehicles. After the defibering process, the feed stock was discharged into a storage tank and then pumped into a thick pulp separator where it was freed from heavy contaminants. The stock was then advanced into a strainer where not yet repulped remnants were separated therefrom. Then the stock was conveyed into a diluting tank and was diluted to a value of 0.8% of dry solid fiber content. From the diluting tank the diluted stock was forced into an apparatus comprising several batteries of separators, where granular flakes with printing ink content were separated in latent vortex. The final purification was carried out in the last battery of separators.

Under the term "alkali reacting compounds", as used herein, there are to be understood, in general, alkalinously reacting compounds, such as e.g. caustic soda lye, sodium carbonate, or the like.

Examples of alkali reacting compounds:
Sodium hydroxide;
Potassium hydroxide;
Sodium silicate;
Sodium carbonate.

Under the term "surface-active agents" as used herein there is meant any surface-active agents characterized by having wetting and detergent power.

Examples of surface active agents:
Alkyl benzene sulphonates, e.g. Dubaral;
Alkyl ether polyoxyethylene sulphonates;
Alkyl phenyl ether polyoxyethylene sulphonates;
Polyoxyethylene alkyl phenol ethers;
Polyoxyethylene alkyl ethers;
Polyglycol esters of fatty acids;
Alkylolamids of fatty acids, e.g. Alfonal K;
Quarternary condensation products of fatty amine with ethylene oxide, e.g. Syntegal V 20.

In general all surface active agents usually used with deinking, at which their wetting power and their washing power are utilized.

EXAMPLE II 3 kgs of waste halftone paper and 1.5% by weight of the paper of a surface active agent such as e.g. Syntegal V 20 in a mixture with Alfonal K in ratio 2:1 were placed into a vertical impregnator-repulper. To the content in the impregnator-repulper 1 % by weight of the paper of sodium hydroxide was added. The wastepaper was allowed to absorb the mentioned substances for 20 minutes within which period the fibers swelled, the printing ink binders became softened and dissolved and the printing ink - paper bonds released. The impregnation was carried out at a consistency of 6% by weight of paper and at a temperature of 50° C. The mixture was defibered for 30 minutes. At the beginning of the defibering, 2% by weight of the paper of terpenic hydrocarbons, e.g. pine oil and thereafter 10% by weight of the paper of highly absorptive flakes were added. The flakes were prepared separately by precipitating a solution of sodium salt of a mixture of soft soap and napthenic soap in ratio 3:1 in the amount 0.09 kg of a calcium chloride solution in a stoichiometric excess. Napthenic soaps are mixtures of alkaline salts of napthenic acids. Napthenic acids are higher saturated monocarbon acids in the chain of which there are cyclopen tane rings; carboxyl group is usually situated at the end of the alkyl chain. In this process due to a mechanical effect particles of printing ink were stirred and separated from the fibers, while the printing inks were dispersed in the substance suspension and absorbed onto the highly absorptive flakes of the vehicles. After the defibering process, the feed stock was discharged into a storage tank and then pumped into a thick pulp separator where it was freed from heavy contaminants. The stock was then advanced into a strainer where not yet repulped remnants were separated therefrom. Then the stock was conveyed into a diluting tank and was diluted to a value of 0.8% of dry solid fiber content. From the diluting tank the diluted stock was forced into an apparatus comprising several batteries of separators, were granular flakes with printing ink content were separated in latent vortex. The final purification was carried out in the last battery of separators.

Latent vortex relates to flowing at which every particle revolves in a circle and moves without rotating on its own axis (this is valid for the whole range of the vortex with the exdeption of its center). It obeys the relationship $VR^n$=constant, at $n=0$–$0$–$1$. Reference* Technicky slovnik naucny (Technical Encyclopedia, Praha SNTL, 1964).

What is claimed is:

1. Apparatus for deinking printed wastepapers, comprising a system for separating granular paper particles with printing ink content, said system comprising a series of vortex separator batteries, conduit means connecting successive ones of the separators so that the granular particles pass progressively therethrough, all of said separators gradually progressively decreasing in a downstream direction both in diameter and length; and including a cylindrical vessel having in its top portion a tangential inlet port and in its bottom portion a tangential outlet port, both of said inlet and outlet ports being oriented in the direction of the vortex created in the separators, the uppermost part of said cylindrical vessel being provided with an axial outlet tube for taking off the finest contaminants while the lowermost part thereof is provided with an inlet tube for supplying thereinto a gaseous medium or water/gas dispersion for causing said medium, before entering the last-mentioned separator, to pass through a perforated partition adapted for uniformly distributing the gaseous medium throughout the entire separator cross-section.

2. Apparatus as defined in claim 1, wherein the system employs four separator batteries.

3. Apparatus as defined in claim 2, wherein the separators are disposed vertically and have an inlet and a first outlet opening at the top and a second outlet opening at the bottom, means for conveying the stock discharged from the bottom openings of the separators of the first two batteries in common with the inlets at the tops of the separators of the third battery, and conduit means for recycling the stock discharged from the top outlets of the separators of said third battery to the inlets at the tops of the separators of said first battery.

4. Apparatus for deinking printed wastepapers, comprising a system for separating granular paper particles with printing ink content, said system comprising a series of vortex separator batteries, the separators being disposed vertically and having an inlet and a first outlet opening at the top and a second outlet opening at the bottom, conduit means connecting the separators so that the granular particles pass progressively therethrough, all of said separators gradually progressively decreasing in a downstream direction both in diameter and length, the separators being so constructed and arranged as to allow successively ever smaller granular paricles with printing ink content to be separated during the passage of paper stock through the system, the conicity and cross-section of the individual separators being selected upon the basis of the differential size and gravity of said granular particles with printing ink content, the conduit means including means for conveying the stock discharged from the bottom openings of the separators of the first two batteries in common into the inlets at the tops of the separators of the third battery, and means for recycling the stock discharged from the top outlets of the separators of said third battery to the inlets at the tops of the separators of said first batter, and means for leading the stock discharged from the discharge openings at the tops of the separators of said second battery into inlet openings at the tops of the separators of the fourth, final separators battery for separating the finest contaminants, the separators in the fourth battery each comprising an upright cylindrical vessel having in its top portion a tangential inlet port and in its bottom portion a tangential outlet port, both of said inlet and outlet ports being oriented in the direction of the vortex created in the separators, the uppermost part of said vessel being provided with an axial outlet tube for taking off the finest contaminants while the lowermost part thereof is provided with an inlet tube for supplying thereinto a gaseous medium or water/gas dispersion, means for causing said medium, before entering the last-mentioned separator, to pass through a perforated partition adapted for uniformly distributing the gaseous medijm throughout the entire separator cross-section.

* * * * *